US008106530B2

(12) United States Patent
Schindler et al.

(10) Patent No.: US 8,106,530 B2
(45) Date of Patent: Jan. 31, 2012

(54) NETWORK-CENTRIC SCHEDULED POWER PROVISIONING METHOD

(75) Inventors: Frederick Schindler, Sunnyvale, CA (US); Daniel Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 548 days.

(21) Appl. No.: 12/199,986

(22) Filed: Aug. 28, 2008

(65) Prior Publication Data

US 2010/0052421 A1 Mar. 4, 2010

(51) Int. Cl.
*H02J 1/04* (2006.01)
(52) U.S. Cl. ........................................................ 307/35
(58) Field of Classification Search ................. 307/35
See application file for complete search history.

(56) References Cited

U.S. PATENT DOCUMENTS

| 4,146,923 A * | 3/1979 | Borkan ........................... 700/296 |
| 4,213,182 A * | 7/1980 | Eichelberger et al. ........ 700/296 |
| 6,895,309 B2 * | 5/2005 | Ito ................................. 700/296 |
| 7,353,407 B2 | 4/2008 | Diab et al. |
| 7,451,329 B2 | 11/2008 | Schindler |
| 7,818,591 B2 | 10/2010 | Schindler |
| 2003/0210340 A1 * | 11/2003 | Frederick Romanowich ................ 348/272 |
| 2009/0121548 A1 | 5/2009 | Schindler et al. |
| 2009/0172421 A1 | 7/2009 | Schindler |
| 2009/0273239 A1 * | 11/2009 | Goodnow et al. ............... 307/35 |
| 2010/0060079 A1 * | 3/2010 | MacLellan et al. ............ 307/35 |
| 2010/0103955 A1 | 4/2010 | Biederman et al. |

* cited by examiner

*Primary Examiner* — Rexford Barnie
*Assistant Examiner* — Hal Kaplan
(74) *Attorney, Agent, or Firm* — BainwoodHuang

(57) ABSTRACT

A particular technique provides power to a plurality of Power over Ethernet powered devices. The technique involves operating, during a first time interval, an initial set of Power over Ethernet powered devices (i.e., one or more powered devices) in a higher power consuming mode and the remaining Power over Ethernet powered devices of the plurality of Power over Ethernet powered devices that are not in the initial set in a lower power consuming mode to maintain total power consumption below a predetermined total power threshold. The technique further involves operating, during a second time interval after the first time interval, a different set of the Power over Ethernet powered devices in a higher power consuming mode and the remaining Power over Ethernet powered devices of the plurality of Power over Ethernet powered devices that are not in the different set in a lower power consuming mode to maintain total power consumption below the predetermined total power threshold.

18 Claims, 3 Drawing Sheets

NETWORK-CENTRIC SCHEDULED POWER PROVISIONING METHOD

TECHNICAL FIELD

The present disclosure relates generally to computer networking and more particularly to power provisioning.

BACKGROUND

Power over Ethernet (PoE) (according to the IEEE 802.3-2005 standard) is used to provide power to network devices over network cabling. Typically, power is provided at up to about 50V at a current of up to about 600 mA (for various extensions to PoE, such as draft PoE+). In a typical PoE implementation (such as standard IEEE 802.3-2005), a maximum of 15.4 W is supplied per device (of which, generally, only 12.95 W is available for device use, the rest potentially dissipating along the cable). Thus, if the powered source equipment (PSE) is equipped with a 1500 W power supply, 97 powered devices (PDs) may be powered by the PSE.

In order to allow more low-powered devices, the devices may indicate a power class. PoE uses 5 power classes (0-4), with classes 0 and 3 providing up to 12.95 W to a PD, class 1 supporting up to 3.84 W, and class 2 providing up to 6.49 W. For example, a PD which uses less than 3.84 W may indicate a power class of 1. The 1500 W PSE can power a class 1 PD with only 4 W of power, thus enabling up to 375 class 1 devices to be powered. Because 12.95 W is insufficient for many complex devices, PoE+ (according to the draft IEEE 802.3 at standard) (and other PoE extensions) was developed. PoE+, as currently envisioned, also allows finer granularity in power classification. Thus, a PoE+ PSE having a 1500 W power supply (which approaches the maximum that can be reliably delivered over a 20 A/115 VAC circuit) can power 50 video camera connections that use 30 W each (due to cable resistance, each camera actually only receives about 25.5 W).

BRIEF DESCRIPTION OF THE DRAWINGS

Objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
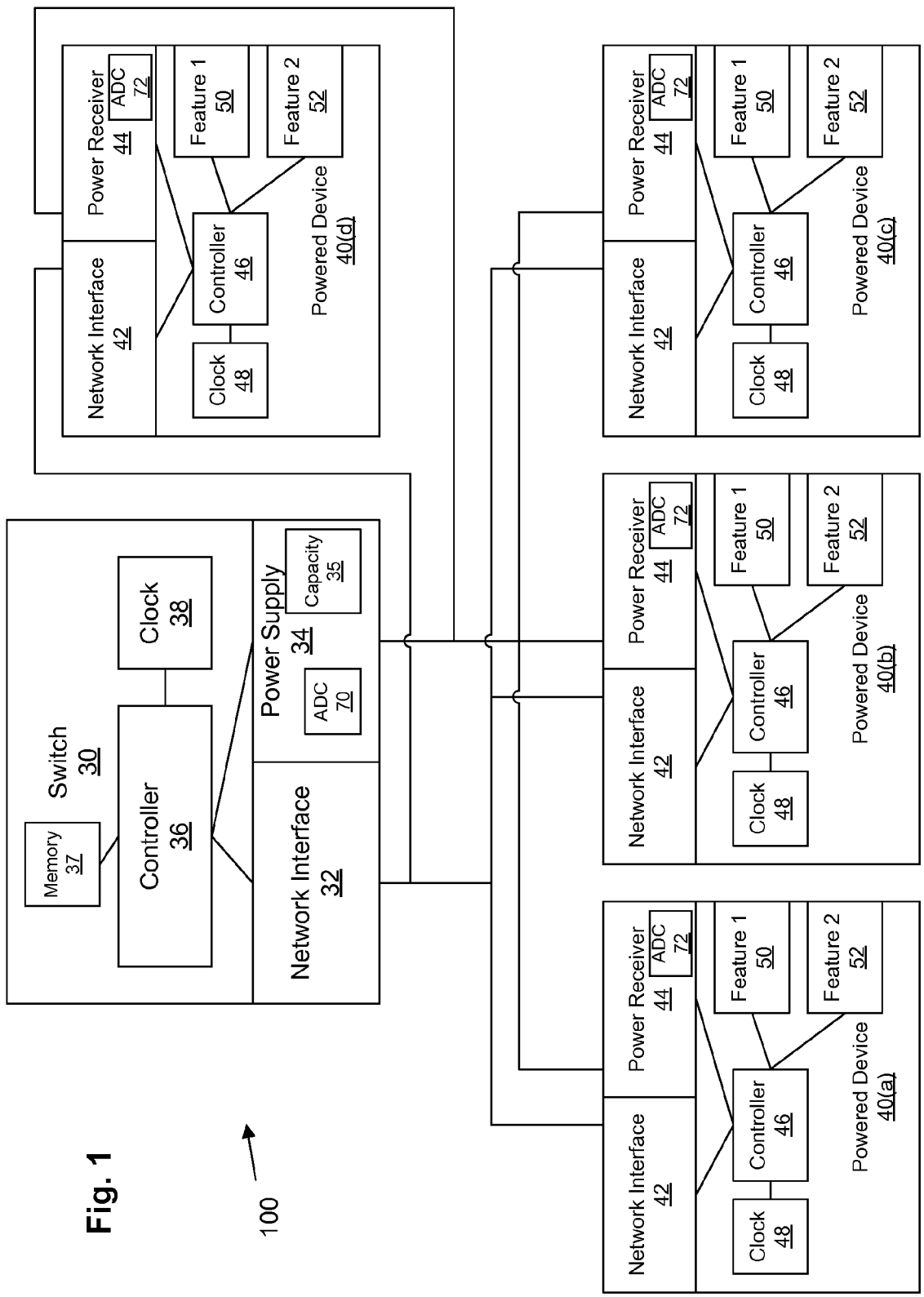
FIG. 1 illustrates an example system and apparatus for use in practicing various embodiments.

The above-described conventional approaches suffer from several deficiencies. In particular, there may be situations in which it would be advantageous to have a large number of high-power PDs available for use but no need to run all of the high-power PDs at the same time. For example, suppose that a particular facility requires a conventional surveillance system having several PoE+ cameras. Due to limitations in the available electrical circuits (e.g., 20 Amp external feeds from a main panel), the conventional surveillance system, which is designed to provide enough power to run all of the PoE+ cameras simultaneously, may require multiple PSEs running on respective separate electrical circuits in order to address the power needs of the system. Alternatively, the conventional surveillance system may be severely limited in the number of PoE+ cameras it includes due to reaching the maximum power capacity of a single PSE connected to a single electrical circuit.

Various embodiments are provided for providing power to a plurality of PDs having a combined power requirement (or potential demand) exceeding the power supply capacity of a PSE. Such embodiments involve controlling the operation of the PDs so that less than all of the PDs run in maximum power demand mode at any one particular time. In particular, some PDs may run in a full operating mode while other PDs run in lower power mode (e.g., an idle or partially active state) so that the system as a whole remains within the power supply capacity of the PSE. Then, at a later time, one or more different PDs may run in the full operating mode while the remaining PDs run in the lower power operating mode.

For example, in the context of a surveillance system having a large number of PoE+ cameras (e.g., more than 50 PoE+ cameras), a control circuit can coordinate the operation of the PoE+ cameras in a manner that prevents the total power demand from ever exceeding the power supply capacity of the PSE. For such a system, each PoE+ camera is able to operate in a high power mode but the control circuit schedules the operation of the cameras so that the power draw of the entire system never exceeds the power capacity of the system (e.g., a pre-established safety threshold which is less than the rated amount of the PSE power supply).

In one embodiment, a method is provided in which for each of a plurality of time slots, an amount of power is assigned to be allocated to each of a plurality of powered devices for that time slot, and power is provided to each powered device according to the assigned power allocation for that time slot.

In another embodiment, power is provided to a plurality of powered devices over a network connection, each device having a maximum power consumption, the sum of the maximum power consumptions of all the powered devices exceeding a maximum power budget. A first set of the plurality of powered devices (i.e., a non-null set having one or more PDs) is scheduled to each draw less than its respective maximum power consumptions during a first time interval such that the total amount of power drawn by the plurality of powered devices in the first time interval does not exceed the maximum power budget. A different set of the plurality of powered devices is scheduled to each draw less than its respective maximum power consumptions during a second time interval after the first time interval such that the total amount of power drawn by the plurality of powered devices in the second time interval does not exceed the maximum power budget.

In another embodiment, an apparatus is provided. The apparatus includes a power supply circuit constructed and arranged to connect to an external power source, the power supply circuit having a predetermined total power threshold. The apparatus also includes a control circuit electrically connected to the power circuit and a plurality of Power over Ethernet ports electrically connected to the control circuit and electrically connected to the power supply circuit, each Power over Ethernet port being constructed and arranged to concurrently convey inline power and data to a respective one of a plurality of Power over Ethernet powered devices in response to control provided by the control circuit. The control circuit, when providing control, is constructed and arranged to (a) during a first time interval, operate an initial set of the Power over Ethernet powered devices in a higher power consuming mode and the remaining Power over Ethernet powered devices of the plurality of Power over Ethernet powered devices that are not in the initial set in a lower power consuming mode to maintain total power consumption below the predetermined total power threshold, and (b) during a second time interval after the first time interval, operate a different set of the Power over Ethernet powered devices in a higher power consuming mode and the remaining Power over Ethernet powered devices of the plurality of Power over Ethernet powered devices that are not in the different set in a lower power consuming mode to maintain total power consumption below the predetermined total power threshold.

Description of Example Embodiments

FIG. 1 depicts a system 100 for providing network power to a plurality of powered devices (PDs) 40, the sum total of the peak power requirements of the powered devices 40 exceeding a power supply capacity 35. Powered source equipment (PSE) 30 is a network switch which also provides power to PDs 40. PSE 30 includes a network interface 32 for connecting to the plurality of PDs 40. The network interface 32 preferably includes a set of Ethernet ports. In one embodiment, network interface 32 connects to a power supply 34 so that power may be provided through the Ethernet ports to the various PDs 40 in accordance with PoE and similar standards. The power supply 34 (which is depicted as residing within the PSE 30, but in another embodiment may reside external to the PSE 30), in one embodiment is a set of circuitry (including, for example, a transformer) for converting 115 V AC power from a standard wall socket into 50 V DC power for distribution to the PDs 40. Power supply 34 includes a maximum power supply capacity 35, which is the maximum amount of power that the power supply 34 is rated to safely and reliably supply. In one embodiment, maximum power supply capacity 35 is 1500 W of power. PSE 30 also includes a controller 36 and a clock 38. The controller 36 may control data communications across network interface 32. The controller 36 connects to memory 37, which may include volatile memory, non-volatile memory, or some combination thereof. The controller 36 also schedules, with the aid of clock 38, power allocations to the various PDs 40.

Each PD 40, taking as an example PD 40(a), includes a network interface 42, which is connected to power receipt circuitry 44. Although network interface 42 and power receipt circuitry 44 are depicted as having separate connections to PSE 30, it should be understood that in some embodiments, both the power and the network data signals are sent between PSE 30 and PD 40(a) over a single cable. In some such embodiments, network data is sent over one set of wires within the cable and power is sent over a separate set of wires, while in another such embodiment, power and network data are sent across the same set of wires. In yet another embodiment, one set of wires within the cable transmits only power, while another set of wires within the cable transmits power and data together. Network interface 42 and power receipt circuitry 44 connect to controller 46. Controller 46 receives and processes network data signals from network interface 42. Controller 46 also sends signals to network interface 42 to be sent across the network to PSE 30. Controller 46 also communicates with network interface 42 to request changes in its power allocation from power supply 34. Based on an assigned power allocation schedule, controller 46 communicates with internal clock 48 to determine how much power to instruct power receipt circuitry 44 to draw at any given time.

In one embodiment, PD 40(a) may include several features. For example, PD 40(a) may include a first feature 50 and a second feature 52. In one embodiment, PD 40(a) is a surveillance camera, and the first feature 50 is a video recording feature, while the second feature 52 is a pan/tilt/zoom (PZT) feature. Thus, in such an embodiment, first feature 50 allows the surveillance camera to record and transmit video. Second feature 52 allows the camera to pan, tilt, and zoom, for example to allow the camera to track a suspicious person or to allow an operator to remotely get a better look at something.

When PD 40(a) is implementing the first feature 50 without implementing the second feature 52, PD 40(a) may require, for example, 15 W of power from the power supply 34. When PD 40(a) is implementing the first feature 50 as well as the second feature 52, PD 40(a) may require, for example, 30 W of power from the power supply 34. Controller 46 is capable of controlling the various features 50, 52 such that when, for example, 30 W of power is allocated to PD 40(a), first feature 50 and second feature 52 may both operate simultaneously, but when less than 30 W of power (but at least 15 W) is allocated to PD 40(a), only first feature 50 is permitted to operate. In some embodiments, in the latter case (when 15-30 W is allocated to PD 40(a)), controller 46 may choose which one of the features 50, 52 is to operate, while the other feature is deactivated.

Figure 2:
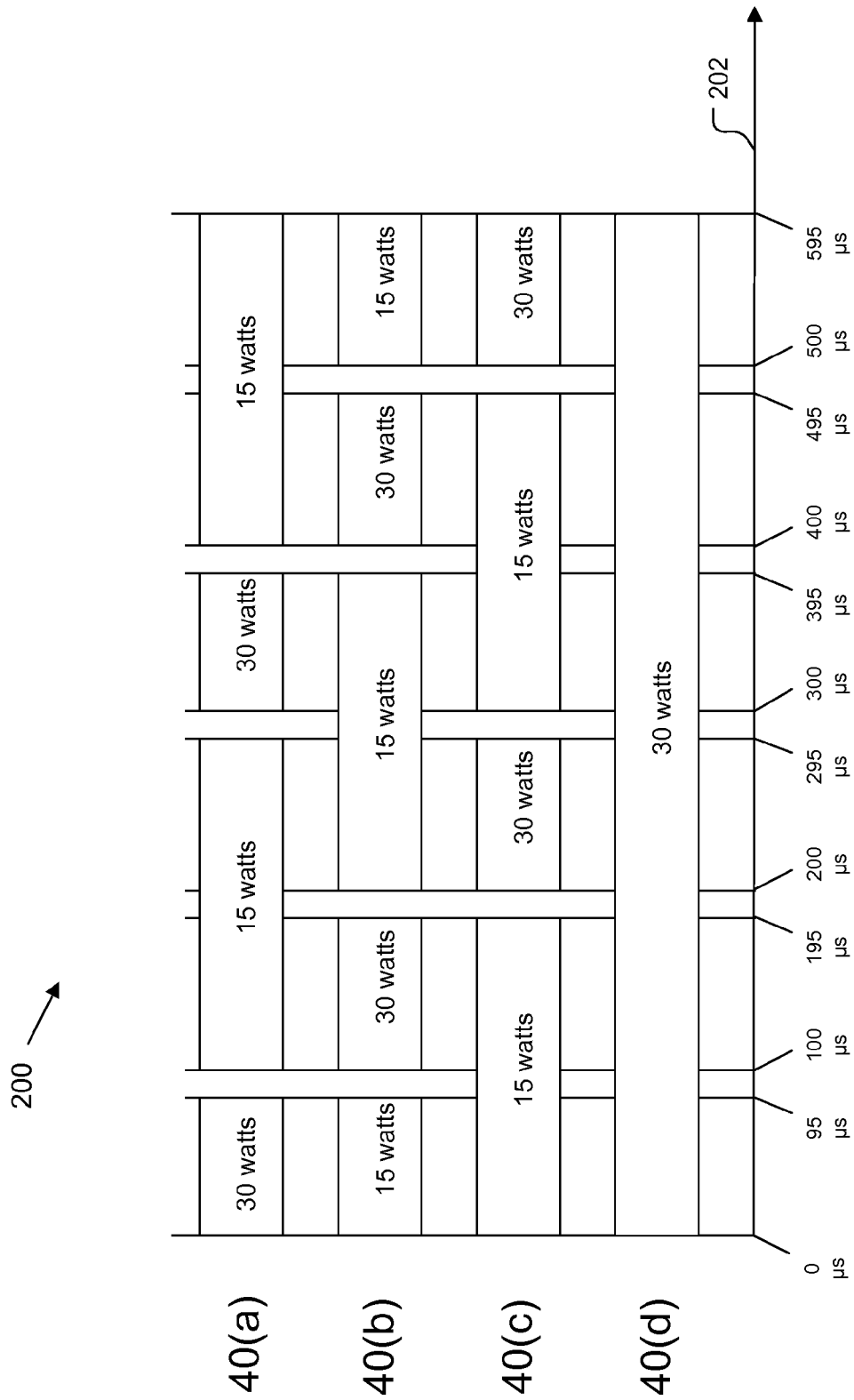
FIG. 2 illustrates an example power-consumption timeline associated with one example embodiment.

FIG. 2 depicts a power-usage diagram 200 associated with system 100. If maximum power supply capacity 35 is, for example, 100 W, then only three 30 W devices can operate simultaneously. Four 30 W devices operating simultaneously could cause power supply 34 to operate beyond its specifications and potentially overheat. However, if PDs 40(a-d) are capable of operating at either 15 W in a low-power mode or at 30 W in a high power mode, two of the PDs 40 may operate in high-power mode while another two operate in low-power mode, the total power draw remaining below 100 W. Because it may be desirable for all of the PDs 40(a-d) to operate in high-power mode at various times, while it is not necessary that all of the PDs 40(a-d) operate in high-power mode simultaneously, in one embodiment, the power allocation may change over time, allowing, for example, one PD 40(a) to operate in high-power mode at one time while a second PD 40(b) operates in low-power mode at the same time, but at a later time for the power allocations (and thus the corresponding modes of operation) of those two devices 40(a-b) to switch.

In one embodiment, this is accomplished by dividing time into various time slots. A time slot is an interval of time, synchronized between PSE 30 and the PDs 40. In one embodiment, time slots do not overlap. Typically, each time slot is the same time in length. Thus, for example, in power-usage diagram 200, each time slot is 95 μs. Time slot 1 runs from 0 to 95 μs after a given reference point, time slot 2 runs from 100 to 195 μs after the reference point, time slot 3 from 200 to 295 μs, etc. Thus, in time slot 1, PDs 40(a) and 40(d) operate in high-power mode, in time slot 2, PDs 40(b) and 40(d) operate in high-power mode, and, in time slot 3, PDs 40(c) and 40(d) operate in high-power mode.

It should be understood that there may be two kinds of time slots. For example, in one embodiment, there may be a system-level time slot, which is the shortest amount of time at which system 100 can alternate power levels. For example, if the system 100 is able to synchronize its various components to within 10 ns of each other, a significantly longer period of time, such as, for example, 1 μs, might be used as a system-level time slot, to allow devices time to respond to events. In addition, a second type of time slot, an application-level or device-level time slot is a longer period of time made up of an integer number of system time slots. A device-level time slot is selected to allow a particular device to comfortably change power levels but also to be short enough to allow for any latency requirements of the device or application, as detailed below. It should be understood, that while system-level time slots do not overlap and are of uniform length within a system 100, device-level time slots may vary in length between various devices executing different applications. Thus, one set of devices might use a 100 μs time slot, while another set of devices might use a 40 μs time slot (see below).

In some embodiments, such as depicted in FIG. 2, a buffer interval interposes between each time slot. Thus, for example, buffer interval, as depicted in FIG. 2, may be 5 μs. The buffer interval allows one PD 40 to ramp down its power draw in anticipation of a lower allocation in the following time slot, so that if a different PD changes from a low-power mode to a high-power mode in the next time slot, the momentary power usage does not exceed specifications. The buffer interval may be chosen based on a power-transition specification for a particular device or set of devices. Thus, for example, a 5 μs buffer interval is appropriate if the surveillance cameras are rated to transition from high-power mode to low-power mode in 4 μs. In some embodiments, the buffer interval may vary from device to device within system 100. Thus if time slot 1 is 0-100 μs and time slot 2 is 100-200 μs, first PD 40(*a*) having a 4 ns transition period may treat 95-100 μs as being the buffer interval, while second PD 40(*b*) having a 7 μs transition period might treat 91-100 μs as being the buffer interval. It should be noted that the length of the time slots should preferably be significantly longer than the length of the buffer intervals. In some embodiments each time slot may be about 100 μs in length, while in other embodiments, each time slot may be about 1000 μs or even 100 ms in length (or longer—a time slot could potentially even be an hour or more in length). In general, the selection of the length of the time slots will depend on the frequency at which operational modes switch and the desired latency in being able to switch operational modes balanced against inefficiencies associated with buffer intervals being large in proportion to the time slots.

In another embodiment, a "graceful transition" may be utilized instead. In some systems, it may be desirable for the current provided across the system to be relatively constant, avoiding large spikes in current draw. This reduces system transients and makes the system 100 more stable. Thus, in one embodiment, a time slot of 500 μs is used, with a buffer interval of 10 μs at the end of each time slot. PD 40(*a*) is scheduled to draw 100 mA in time slot 1 and 70 mA in time slot 2, while PD 40(*b*) is scheduled to draw 70 mA in time slot 1 and 100 mA in time slot 2. In order to keep the power demand relatively constant, PD 40(*a*) might gradually (either linearly or along a smooth curve) transition from 100 mA to 70 mA in the interval between 490 and 500 μs, while simultaneously, PD 40(*b*) might gradually (either linearly or along a smooth curve) transition from 70 mA to 100 mA in the interval between 490 and 500 μs. In the theoretical case of a perfect linear transition, the total current draw remains at exactly 170 mA over the entire time interval 0-990 μs (merely remaining extremely close to 170 mA, for example ±15 mA, in real-world applications). If, however, second PD 40(*b*) did not begin to increase its power draw until after first PD 40(*a*) had completed its transition to a lower power draw, then the current draw of the system would drop from 170 mA down to 140 mA, and then increase back up to 170 mA, causing a 30 mA spike, which, in some systems, might be dangerous or undesirable. Thus, using the buffer interval to allow graceful transitions allows such an undesirable situation to be avoided.

It should be understood that in some systems, such as, for example, a PoE+ system 100, capacitance issues may further limit the length of a time slot. If a PD 40 has a capacitor and the system 100 limits the rate at which a capacitor may be charged to 15 mA/μs, a time slot of no less than 40 μs should be used. If a PD 40 draws 600 mA or current and briefly surges 15% above that value, then a time slot of at least 706 μs (or to give a margin of error, 750 μs) should be used. Thus, system 100 might have a system-level time slot of 10 μs, but for one set of high-powered PDs 40(*a-b*), the device-level time slot is 750 μs (75 consecutive system-level time slots), while for another set of low-powered PDs 40(*c-d*), the device-level time slot is 50 μs (5 consecutive system-level time slots).

In one embodiment, the PD 40(*a*) is a surveillance camera, which operates two features, as described above. Because a typical camera records a new field about every 16.7 ms or a new frame about every 33.4 ms, a latency of less than a field- or frame-length is desirable, but need not be much lower. Thus, a time slot might be on the order of 10 ms in length.

In some embodiments, in some time slots, a PD 40 may not draw any power at all from the power supply 34. According to the PoE specification, a PD 40 must draw a minimum amount of current for at least 60 ms out of every 460 ms. Thus, if a particular PD 40 only needs power intermittently, it might be scheduled to draw power in one or more time slots, and then not draw power again for several time slots, in conformance with the PoE specification, perhaps drawing any charge that it need to operate while unpowered from an internal capacitor. For example, a surveillance camera which records a field every 16.7 ms might only require power for a total of 5 ms around the capture time of each field to allow it to record the field and store it in memory and/or transmit it across the network. Thus, for a period of 11.7 ms between fields, no power may be needed. Thus, if a time slot of 1 ms is used, the system might schedule 5 powered time slots followed by 11 unpowered time slots, followed by 6 powered time slots, then 11 more unpowered slots, etc., making sure that the system is powered for at least 5 ms at the appropriate times. In some embodiments, the powered time slots need not correspond exactly with the times the camera needs power, because the camera may draw some power from its capacitor for part of the time it requires power.

In another embodiment, PD 40(*b*) might be a voice over IP (VOIP) telephone. In such a case, the low-power mode might be a standby mode, while the high-power mode might be an operating mode. In standby mode, the VOIP telephone might draw only 2 W and be configured to perform a monitoring function. In operating mode, the VOIP telephone might draw 8 W and be configured to perform many functions, such as ringing, allowing a user to talk and listen over a full-duplex connection, allowing a user to dial an outgoing number, or allow a user to make a configuration change. In some embodiments, several operating modes may exist, each operating mode drawing a distinct amount of power. The monitoring function, upon detecting that any button on the VOIP telephone has been pressed or that the receiver has been picked up (or upon receiving any other sort of user input, such as, but not limited to, a voice command, a touchscreen touch, etc.), might send a request to the PSE 30 to switch to high-power operating mode. Similarly, monitoring function might send a similar request upon detecting an incoming call (although in another embodiment, controller 36 might detect the incoming mode before PD 40(*b*) detects it, allowing controller 36 to initiate the request to change modes). Thus, the latency for such an application depends upon the latency which a human user of the VOIP telephone would be able to detect. Such a latency might be on the order of 100 ms.

In some embodiments, this latency might not be an issue at all. In one embodiment, the telephone 40(*b*) might have a built-in capacitor, against which the telephone may draw enough current to run in high-power mode for 200 ms. Thus, even if the PSE 30 does not update the power mode for up to 200 ms, a user will not even notice. In another embodiment, the latency might not be an issue if a reserve power is maintained at the power supply 34. For example, if power supply 34 is rated to supply 1500 W of power, it might allocate a budget of only 1300 W, allowing it to provide 115% burst power in accordance with a draft PoE+ specification. In such a case, PSE 30 might allocate 2 W to each of 650 VOIP telephones, all operating in standby mode. If a VOIP telephone needs to enter operational mode, the power supply 34 can provide an additional 6 W of power to that phone without exceeding its maximum capacity of 1500 W because it maintains a reserve power of about 200 W. Thus, the PSE 30 need not modify the power allocation schedule at all, thus rendering the latency a non-issue. In this example, up to 33 VOIP telephones could enter operational mode without the PSE 30 having to modify the power allocation schedule. Once 33 VOIP telephones are in operational mode, the VOIP telephones would be required to make a power level request in order to change modes.

In another embodiment, some of the PDs 40 may be energy-efficient office light-fixtures, each drawing about 25 W of power during office hours (e.g., 8 am-6 pm), but operating in standby mode (drawing, say, 0.5 W per light fixture) the rest of the day. Other PDs 40 may be print servers, which operate in standby mode (drawing, say, 5 W of power each) except when a print job is sent to the print server, at which point, the print server will need to switch to an operational mode (drawing, say, 50 W) for the duration of the print job. Certain print jobs may be marked as non-urgent, and the print servers may schedule these print jobs to be processed during off-hours, for example, between 11 pm and 6 am when off-peak electricity rates are cheaper. Thus, non-urgent print jobs may be queued and the print servers may request to be placed into operational mode for an hour or two in the middle of the night to take advantage of the lower electricity rates while printing the non-urgent print jobs. In this application, only a relatively slow latency is required, and thus, a time slot of about 1 second could be used.

In another embodiment, the system 100 could be a regional power grid for a large power company (PowCo). PowCo provides power to, say, 10 million homes, and maintains network communications with select high-powered devices in those homes, either over a dedicated set of network connections or through high frequency power-line modulation. During peak hours, total power demand for the power grid may exceed the grid's maximum capacity. For example, between noon and 4 pm power demand might exceed capacity by 15%. In order to avoid brownouts and traditional rolling blackouts, PowCo implements an embodiment by turning off high-powered air conditioners and refrigerators for 15 minutes out of every hour in the peak period (perhaps by de-powering for 1 minute, then powering for 3 minutes, in a cycle). Each air conditioner and refrigerator is equipped with a clock that allows it to synchronize with the PowCo master clock and turn on and off as scheduled. Because millions of devices could be affected, PowCo staggers the times, to keep overall demand smooth, by scheduling sets of devices to power and de-power at sub-millisecond intervals. Thus, a high degree of precision synchronization must be used. If a 100 μs time slot is used, there will be 2.4 million time slots in a 4-minute interval. If the system 100 has 9.6 million active high-powered devices, then each such device could be placed into one of 2.4 million classes, each class having 4 devices, the power-on time for each class staggered by 100 μs. Thus, 4 devices turn on in any given time slot and remain on for 1.8 million consecutive time slots, followed by 600,000 unpowered time slots. During that same initial time slot, 4 other devices shut off. In any given time slot, 7.2 million devices are powered, while 2.4 million devices are unpowered. This allows system 100 to reduce power demand among high-powered devices by 25%.

In another embodiment, a factory could be efficiently powered. For example, the factory contains an assembly line including a management system and several sensors, motors, robots, etc. Some components might only require power for portions of the assembly process. Thus, for example, as an item moves along a conveyer belt, assembly line, or the like, the precise time the item enters is recorded. This allows the management system to know when the item is near a piece of equipment, possibly minutes before. A management system usually records times at different points in the network and, with knowledge of the speed of the conveyer belt, can enable the various components to perform certain tasks (such as scanning, welding, moving, etc). This would reduce power consumption by only turning on, or only using a secondary power level, prior to and during its operation. For example prior to the item being worked on, the PSE 30 (or management system) could add extra power to the PD 40 to perform its operation on the item. A sensor would be a good example, sensor (PD 40) is off until an item is expected in range. Say, 10 us prior to the PD 40 being in range, the PSE 30 sends extra power to (or turns on) the sensor (PD 40). After the item is sensed, the PD 40 turns off and power is removed.

Figure 3:
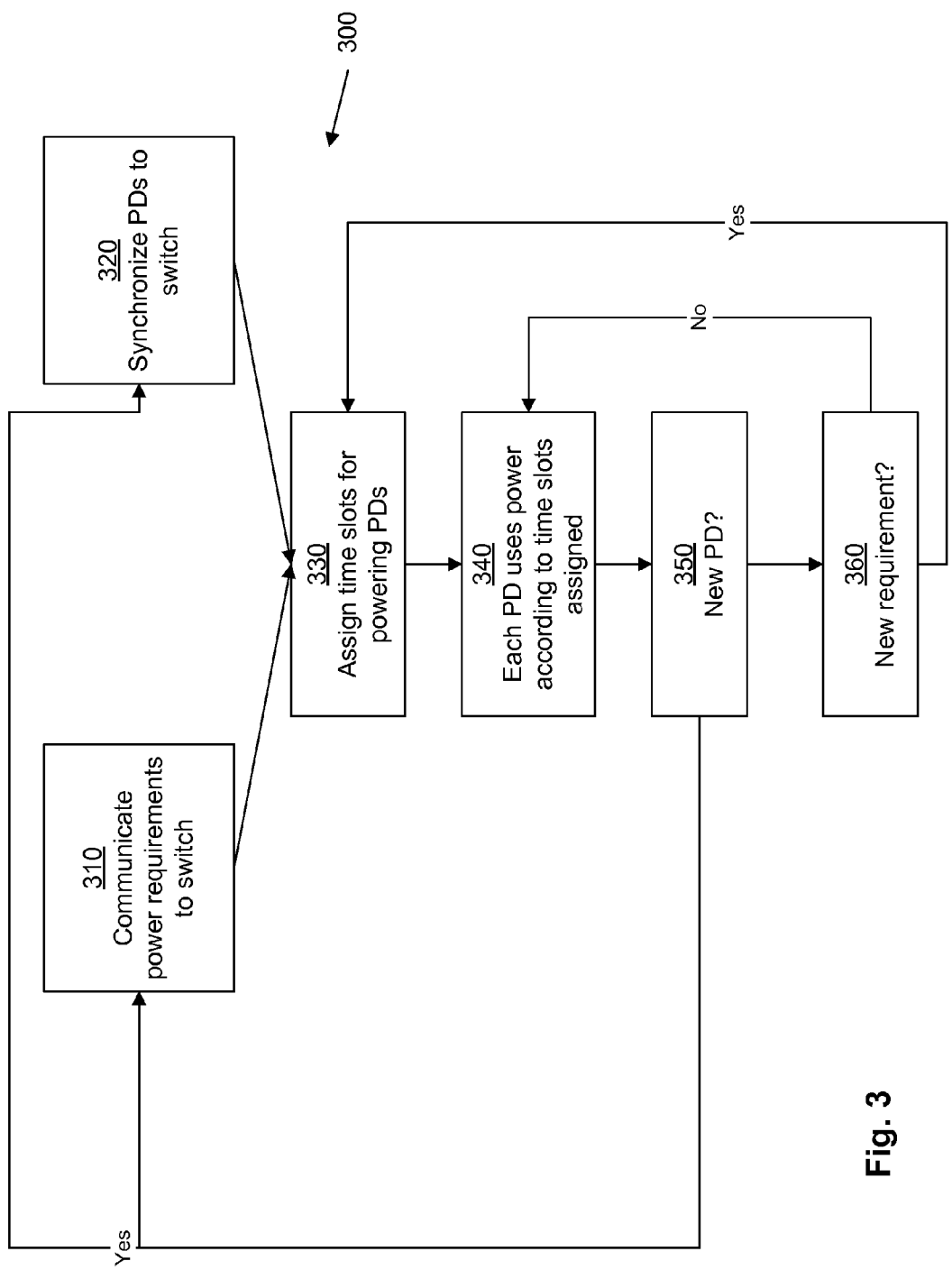
FIG. 3 illustrates an example method of one embodiment.

FIG. 3 depicts a method 300 of one embodiment. In step 310, a PD 40 communicates its power requirements to PSE 30. Upon initial configuration of the system 100, every PD 40 communicates its power requirements to the PSE 30. The power requirements may include a list of operational modes (standby, operating) or a list of mandatory and optional features, together with the associated required power for each mode and/or feature. The power requirements may also include data indicating a desired schedule of modes and features or a list of conditions that should trigger a mode or feature change in the PD 40.

In step 320, which may occur simultaneously with step 310, or before or after step 310, a PD 40 synchronizes its internal clock 48 to the main clock 38 of the PSE 30. Upon initial configuration of the system 100, every PD 40 performs this synchronization. This allows every PD 40 to operate in synchronization with each other according to a power-usage schedule. This synchronization and the associated scheduling may, in one embodiment, be performed according to the Precision Time Protocol defined in the IEEE 1588-2002 standard. In other embodiments, other protocols, such as IEEE 802.3as or IETF TIC-TOC, may be used. In a system 100 having less precise timing needs, the Network Time Protocol (NTP) might instead be used. PDs 40 may additionally periodically re-synchronize their internal clocks 48 with main clock 38 to prevent drift.

In step 330, controller 36 assigns power allocations to the various PDs 40 for various time slots from the present through some future point in time, such power assignments being stored in memory 37. For example, given a time slot of 100 μs, controller 36 might assign time slots up to 10 seconds in advance (although such assignments may be subject to change, see below), thereby buffering 100,000 time slots in advance. The assignment of power allocations may be done according to any one of a number of methods, so long as within any given time slot, the sum of the power allocations to all the PDs 40 remains less than or equal to the maximum power supply capacity 35 (or alternatively, a maximum power budget, which may be less than the power supply capacity 35, differing by the size of a reserve power budget) of the power supply 34 (although the system may allow for temporary increases within a tolerance, such as 15%, above the maximum power supply capacity 35). In one example, every PD 40 has an associated priority, and power is allocated based on the priorities. In another embodiment, power is allocated according to the desired schedule of modes or features sent in step 310. If following the desired schedule of every PD 40 allows the system 100 to perform below the maximum power supply capacity 35, then that allocation schedule is established, but if, in any given time slot the desired schedule would cause the maximum power supply capacity 35 (or the maximum power supply capacity 35 plus the tolerance) to be exceeded, then power is allocated between competing devices for that time slot according to a priority between the devices.

In step 340, power supply 34 supplies power to the PDs 40. In any given time slot, each PD 40 draws less than or equal to the amount of power allocated to it for that time slot by the PSE 30. Controller 46 keeps track of the power allocation schedule against its internal clock 48, and powers down certain features 50, 52 in accordance therewith or enters an appropriate operational mode in accordance therewith. Controller 46 may also direct power receipt circuitry 44 to draw only a certain amount of power in accordance with the allocation.

In step 350, if a new PD 40 is connected to the system 100, then the new PD 40 communicates its power requirements to the PSE 30 in accordance with step 310 and synchronizes its internal clock 48 with the main clock 38 in accordance with step 320 and operation proceeds from there, the assignment of power allocations possibly changing according to step 330, etc.

In step 360, if a PD 40, such as PD 40(*b*) has a change in its power requirements, then operation proceeds to step 330 so that the assignment of power allocations, stored in memory 37, may be updated to reflect the new needs. In one embodiment, the PD 40(*b*) will sua sponte communicate new power requirements to the PSE 30. For example, if PD 40(*b*) is a VOIP telephone in standby mode and a user picks up the handset, PD 40(*b*) will communicate a request to enter its high-power operating mode as soon as possible. If it is possible, within the allocation algorithm of step 330 (and any priorities to be considered) to accommodate such a request, then controller 36 will assign a higher power allocation to PD 40(*b*) in the next time slot, or in the next time slot that it is able to. This change in the allocation schedule may require that a lower priority device be downgraded to a lower-power allocation in such time slot(s) (although, as noted above, this may be avoided in many cases through the use of a power reserve). In another embodiment, the controller 36 may itself decide that a new power requirement necessitates a change. Thus, again assuming that PD 40(*b*) is a VOIP telephone, if an incoming call is directed to the VOIP telephone 40(*b*), controller 36 may detect such an incoming call and preemptively enter step 330 so that PD 40(*b*) may be assigned a higher power allocation in the next time slot, or in the next time slot that it is able to. This change in the allocation schedule may require that a lower priority device be downgraded to a lower-power allocation in such time slot(s).

In another embodiment, the new requirement may be initiated by a human operator. For example, if PD 40(*a*) is a surveillance camera operating only a record/transmit feature 50, but not a PZT feature 52, then a human operator monitoring the outputs of several surveillance cameras might notice suspicious activity occurring within the view of surveillance camera 40(*a*). In such a case, the human operator may manually communicate a new requirement to the controller requesting that additional power be allocated to PD 40(*a*) as soon as possible. If it is possible, within the allocation algorithm of step 330 (and any priorities to be considered) to accommodate such a request, then controller 36 will assign a higher power allocation to PD 40(*a*) in the next time slot, or in the next time slot that it is able to. This change in the allocation schedule may require that a lower priority device be downgraded to a lower-power allocation in such time slot(s). In some embodiments, a manual communication of a new power requirement by a central human operator may be assigned a highest priority. Once PD 40(*a*) is allocated more power, it may activate the PZT feature 52 and allow the human operator to manually pan, tilt, and/or zoom the camera to best view the suspicious activity. In another embodiment, controller 36 (or a monitoring computer in communication with controller 36) may run a program which constantly monitors the outputs of several surveillance cameras, utilizing an algorithm to automatically detect suspicious activity and thereby automatically generate a new requirement request so that the camera 40(*a*) can automatically follow the suspicious activity according to the instructions of the monitoring program. In yet another embodiment, a similar (yet smaller-scale) monitoring program may run on camera 40(*a*) itself, allowing the PD 40(*a*) to sua sponte communicate new power requirements to the PSE 30.

PSE 30 and PDs 40 can also measure the power consumption of PDs 40. Thus, with reference back to FIG. 1, one embodiment includes one or more analog to digital converters (ADCs) 70 to measure PSE voltage and current provided to the PDs 40. The product of the voltage and PD current is the PD power consumption. The sum of the PD power consumptions represents the aggregate power being supplied to the PDs. Similarly, in yet other embodiments, a PD 40 would measure the power it consumes using an ADC 72. Ethernet (or another network protocol) may be used to communicate power measurements between the PSE 30 and PD 40.

The power measurements collected over time, which may be stored in memory 37, may be mathematically manipulated to provide power statistics that include the mean and standard deviation of a PD power or the aggregate PD power demand. Each measurement is associated with a central time reference using IEEE 1588-2002 (or another time synchronization protocol) so that aggregate measurements may be synchronized. Power statistics may be used to predict power demand at various points within a power grid. These results may be used to verify power values requested by a PD 40 or an aggregate of PDs 40, or to provide estimates for power demands by a PD 40 or an aggregate of PDs 40 that may or may not have the ability to dynamically report power demands. This data can be used to manage power budgets of the grid.

While various embodiments of the invention have been particularly shown and described, it will be understood by those skilled in the art that various changes in form and details may be made therein without departing from the spirit and scope of the invention as defined by the appended claims.

For example, it should be understood that the pre-defined maximum power capacity was described in some of the embodiments as a maximum PSE power supply rating by way of example only (see the power supply 34 in FIG. 1). In other arrangements, the pre-defined maximum power capacity is a different power threshold such as the power limit of the particular external power feed (e.g., the electrical circuit, street power, an array of backup batteries, etc.), a limit of some other component or system aspect (e.g., a cable limit, a current limit, a heat/temperature limit, etc.), and the like.

As an additional example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

As an additional example, it should be understood that although various embodiments have been described as operating over Power over Ethernet, the invention is not limited to such implementations. Indeed, in some embodiments, other power provisioning systems may be utilized instead of or in addition to Power over Ethernet. For example, a different inline power provisioning technology may be used. As an additional example, Ethernet (or another networking protocol) may be used for network communication between the PSE 30 and PDs 40 while power is supplied from an external power source (or, alternatively, a power supply located within the PSE 30) to the PDs 40 over a separate set of power cables.

As an additional example it should be understood that although various embodiments have been described as utilizing two operating modes or as operating two features 50, 52, the invention is not limited to such embodiments. In other embodiments, more than two operating modes, each operating mode having a distinct power requirement may be used in accordance with the principles enumerated herein. Similarly, in yet other embodiments, more than two features may be operated in accordance with the principles enumerated herein, different combinations of features each potentially requiring a different amount of power.

Furthermore, it should be understood that all embodiments which have been described may be combined in all possible combinations with each other, except to the extent that such combinations have been explicitly excluded.

What is claimed is:

1. A method comprising:
   for each of a plurality of time slots:
      assigning an amount of power to be allocated to each of a plurality of powered devices for that time slot;
      providing power to each powered device according to the assigned power allocation for that time slot; and
   synchronizing a clock on each powered device with a main clock.

2. A method as in claim 1 wherein assigning the amount of power to be allocated to each of the plurality of powered devices for that time slot includes:
   assigning a power allocation to each powered device for that time slot, the total of the power allocations summing to a total power allocation for that time slot, the total power allocation for that time slot not exceeding a predefined maximum power capacity.

3. A method as in claim 1 wherein the time slots are separated from each other by a buffering interval.

4. A method as in claim 3 wherein each time slot is a period of time equal to 95 microseconds and the buffering interval is a period of time equal to 5 microseconds.

5. A method as in claim 1 wherein providing power to each powered device includes providing the power inline over a network connection.

6. A method as in claim 1 wherein the method further comprises:
   measuring, at periodic intervals, an actual power consumption of each of the plurality of powered devices; and
   maintaining power-usage statistics based on the measured actual power consumption of each of the plurality of powered devices.

7. A method comprising:
   for each of a plurality of time slots:
      assigning an amount of power to be allocated to each of a plurality of powered devices for that time slot; and
      providing power to each powered device according to the assigned power allocation for that time slot; and
   receiving power requirements for each powered device of the plurality of powered devices, wherein receiving power requirements for each powered device includes:
      receiving a first signal indicating a first amount of power required for the powered device to sustain a first operating mode; and
      receiving a second signal indicating a second amount of power required for the powered device to sustain a second operating mode, the first amount of power being distinct from the second amount of power;
      wherein the first operating mode is a standby mode and the second operating mode is an operational mode;
   wherein:
      the powered device is a telephone;
      when the telephone operates in the standby mode, the telephone is configured to:
         upon receiving an incoming call, send a request to switch to the operational mode; and
         upon sensing a user input on the telephone, send a request to switch to the operational mode; and
      when the telephone operates in the operational mode, the telephone is configured to perform ordinary functions, the ordinary functions including one or more of:
         ringing;
         providing a full-duplex telephonic connection;
         dialing an outgoing telephone number; and
         receiving a user-input configuration change.

8. A method comprising:
   for each of a plurality of time slots:
      assigning an amount of power to be allocated to each of a plurality of powered devices for that time slot; and
      providing power to each powered device according to the assigned power allocation for that time slot; and
   receiving power requirements for each powered device of the plurality of powered devices, wherein receiving power requirements for each powered device includes:
      receiving a first signal indicating a first amount of power required for the powered device to sustain a first operating mode; and
      receiving a second signal indicating a second amount of power required for the powered device to sustain a second operating mode, the first amount of power being distinct from the second amount of power;
   wherein:
      the first operating mode is an unpowered mode and the second operating mode is a powered mode;
      when operating in the unpowered mode, the powered device is configured to draw reserve charge from a capacitor; and
      receiving power requirements for each powered device further includes:
         receiving an indication of a maximum time interval during which the powered device is guaranteed to be able to remain powered while operating in the unpowered mode.

9. A method comprising:
for each of a plurality of time slots:
assigning an amount of power to be allocated to each of a plurality of powered devices for that time slot; and
providing power to each powered device according to the assigned power allocation for that time slot; and
receiving power requirements for each powered device of the plurality of powered devices, wherein receiving power requirements for each powered device includes:
receiving a first signal indicating a first amount of power required for the powered device to sustain a first operating mode; and
receiving a second signal indicating a second amount of power required for the powered device to sustain a second operating mode, the first amount of power being distinct from the second amount of power;
wherein the method further comprises:
receiving a request from a powered device of the plurality of powered devices to change operating modes; and
in response to receiving the request from the powered device to change operating modes, changing the power assignment for that powered device in a future time slot if doing so would not cause a pre-defined maximum power capacity to be exceeded during that time slot.

10. A method as in claim 9 wherein:
while operating under the first operating mode, the powered device operates a first feature but not a second feature; and
while operating under the second operating mode, the powered device operates both the first feature and the second feature.

11. A method as in claim 10 wherein:
the powered device is a surveillance camera;
the first feature is a video recording feature; and
the second feature is a pan/tilt/zoom feature.

12. A method as in claim 9 wherein the method further comprises:
in response to receiving the request from the powered device to change operating modes, changing the power assignment for another powered device in the future time slot.

13. A method as in claim 9 wherein the method further comprises:
receiving power requirements for a new powered device;
in response to receiving power requirements for the new powered device:
assigning an amount of power to be allocated to the new powered device for each of the plurality of time slots;
changing the power assignments for each powered device of the plurality of powered devices for each of the plurality of time slots such that the pre-defined maximum power capacity will not be exceeded in any of the plurality of time slots; and
providing power to the new powered device according to the assigned power allocation for each of the plurality of time slots.

14. A method comprising:
providing power to a plurality of powered devices over a network connection, each device having a maximum power consumption, the sum of the maximum power consumptions of all the powered devices exceeding a maximum power budget;
scheduling a first set of the plurality of powered devices to each draw less than its respective maximum power consumptions during a first time interval such that the total amount of power drawn by the plurality of powered devices in the first time interval does not exceed the maximum power budget; and
scheduling a different set of the plurality of powered devices to each draw less than its respective maximum power consumptions during a second time interval after the first time interval such that the total amount of power drawn by the plurality of powered devices in the second time interval does not exceed the maximum power budget.

15. An apparatus comprising:
a power supply circuit constructed and arranged to connect to an external power source, the power supply circuit having a predetermined total power threshold;
a control circuit electrically connected to the power circuit;
a plurality of network ports electrically connected to the control circuit and electrically connected to the power supply circuit, each network port being constructed and arranged to concurrently convey power and data to a respective one of a plurality of powered devices in response to control provided by the control circuit; and
a main clock;
the control circuit, when providing control, being constructed and arranged to:
synchronize a clock on each powered device with the main clock;
during a first time interval, operate an initial set of the powered devices in a higher power consuming mode and the remaining powered devices of the plurality of powered devices that are not in the initial set in a lower power consuming mode to maintain total power consumption below the predetermined total power threshold, and
during a second time interval after the first time interval, operate a different set of the powered devices in a higher power consuming mode and the remaining powered devices of the plurality of powered devices that are not in the different set in a lower power consuming mode to maintain total power consumption below the predetermined total power threshold.

16. An apparatus as in claim 15 wherein the first time interval and the second time interval are separated by a buffering interval.

17. An apparatus comprising:
means for providing power to a plurality of powered devices over a network connection, each device having a maximum power consumption, the sum of the maximum power consumptions of all the powered devices exceeding a maximum power budget;
means for scheduling a first set of the plurality of powered devices to each draw less than its respective maximum power consumptions during a first time interval such that the total amount of power drawn by the plurality of powered devices in the first time interval does not exceed the maximum power budget; and
means for scheduling a different set of the plurality of powered devices to each draw less than its respective maximum power consumptions during a second time interval after the first time interval such that the total amount of power drawn by the plurality of powered devices in the second time interval does not exceed the maximum power budget.

18. Software encoded in one or more tangible computer-readable media, which when executed by a computer is operative to cause the computer to:
provide power to a plurality of powered devices over a network connection, each device having a maximum power consumption, the sum of the maximum power consumptions of all the powered devices exceeding a maximum power budget;

schedule a first set of the plurality of powered devices to each draw less than its respective maximum power consumptions during a first time interval such that the total amount of power drawn by the plurality of powered devices in the first time interval does not exceed the maximum power budget; and schedule a different set of the plurality of powered devices to each draw less than its respective maximum power consumptions during a second time interval after the first time interval such that the total amount of power drawn by the plurality of powered devices in the second time interval does not exceed the maximum power budget.

\* \* \* \* \*